United States Patent [19]

Mashimo et al.

[11] Patent Number: 4,715,176

[45] Date of Patent: Dec. 29, 1987

[54] POWER TRANSMISSION TENSILE CORD AND BELT MANUFACTURE

[75] Inventors: Satoshi Mashimo, Akashi; Kunihiro Fujita, Nishinomiya; Masayuki Tanaka, Kobe; Yoshio Yamaguchi, Kobe; Kazuhiro Takeda, Kobe, all of Japan

[73] Assignee: Mitsuboshi Belting Ltd., Nagata Kobe, Japan

[21] Appl. No.: 869,331

[22] Filed: Jun. 2, 1986

[30] Foreign Application Priority Data

Jun. 3, 1985 [JP] Japan .................... 60-121047

[51] Int. Cl.[4] .................... D02G 3/40; D02G 3/48
[52] U.S. Cl. .................... 57/251; 57/7; 57/297; 57/902; 156/137; 156/148
[58] Field of Search .................... 57/250, 251, 295–297, 57/7, 902; 156/137–142, 148, 149

[56] References Cited

U.S. PATENT DOCUMENTS

| 3,216,187 | 11/1965 | Chantry et al. ........... 57/902 X |
| 3,419,060 | 12/1968 | Goy .................... 57/902 X |
| 3,469,001 | 9/1969 | Keefe, Jr. ............... 57/902 X |
| 3,564,835 | 2/1971 | Keefe, Jr. et al. .......... 57/902 X |
| 3,666,584 | 5/1972 | Fix .................... 156/84 |
| 3,838,561 | 10/1974 | Munting ................ 57/902 X |
| 3,854,515 | 12/1974 | Takemura et al. ......... 57/902 X |
| 4,357,385 | 11/1982 | Kuroda et al. ........... 57/902 X |
| 4,522,614 | 6/1985 | Matsuoka et al. ......... 474/260 |

FOREIGN PATENT DOCUMENTS 159711  10/1985  European Pat. Off. .

Primary Examiner—John Petrakes
Attorney, Agent, or Firm—Wood, Dalton, Phillips, Mason & Rowe

[57] ABSTRACT

A manufacture of an impact-resistant power transmission belt tensile cord and belt using the same. The tensile cords of the invention are caused to have coordinated characteristics of toughness, elongation under load, shrinkage, and shrinkage stress so as to provide absorption of longitudinal and transverse impact shock forces to the belt during high power transmission therethrough, with minimized dimensional changes of the belt over the useful life thereof, permitting the belt to be utilized in multiple parallel drive applications in extremely rigorous environments with minimized maintenance. The tensile cords are adhesively coated, thermally drawn and set multifilament polyester cords.

15 Claims, 1 Drawing Figure

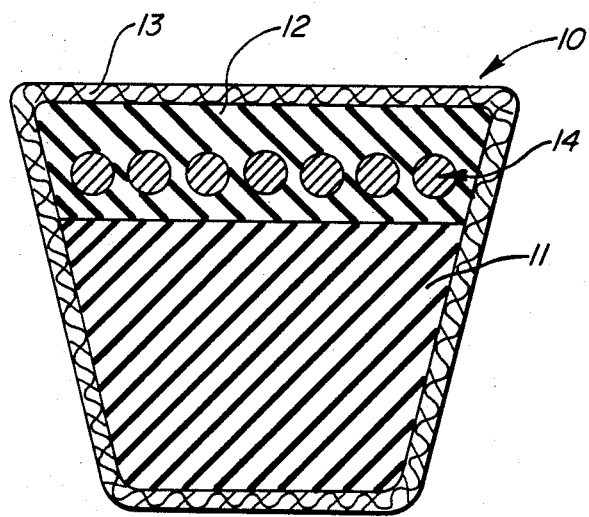

POWER TRANSMISSION TENSILE CORD AND BELT MANUFACTURE

TECHNICAL FIELD

This invention relates to power transmission belts and in particular to impact-resistant power transmission belt manufacture.

BACKGROUND ART

In one form of conventional power transmission belt, tensile cords are embedded in a cushion rubber portion of the belt body for providing high strength and controlled longitudinal extension of the belt.

In providing high power transmission, it is common to utilize a plurality of such belt members in parallel and, thus, it is important that the belts have maintained elongation characteristics so that each belt transmits its share of the total load.

A serious problem arises in such multiple parallel belt drives where the belts are subject to shock or impact forces. Such forces, which may be directed both longitudinally and transversely of the belt, have been found to cause undesirable dimensional changes in the belt members, thereby seriously reducing the life of the belt.

Such belts illustratively are utilized in the power transmission drives of compressors, crushers, harvester and thresher apparatuses, etc. Not only are the belts in such drives subject to such impact forces, but are required to transmit heavy loads at high efficiencies.

Another problem which arises in such drives is the evolution of heat as a result of the friction between the belt and the drive pulleys during operation of the apparatus. Such heat causes a shrinking of the conventional tensile cords, thereby further reducing the useful life of the belt.

It has been conventional to form such tensile cords by twisting strands of multifilament yarns helically to form a cord, which is then coated with an adhesive to provide an improved bonding of the cord to the rubber in which it is embedded.

It is conventional to stretch and heat set the cord prior to the embedding to impart desired resilience and high heat shrinkage stress. The cord is incorporated in the unvulcanized bedding rubber under tension.

A problem arises in the vulcanization of the rubber in that the heat of the vulcanization tends to relax and degrade the characteristics of the cord.

To overcome this problem, it has been conventional to utilize high tenacity polyester fibers.

It has been conventional to elongate the cords 5% or more by multistage drawing of the polyester fibers. One example of such a manufacture is illustrated in Japanese Patent Publication No. 50578/1980.

Another attempted solution to the problem of such heat degradation is disclosed in Japanese Patent Provisional Publication No. 161119/1982. This patent discloses a method of manufacturing the polyester fiber yarns in such a manner as to cause them to exhibit high efficiency, low shrinkage, high tenacity, and high fatigue resistance.

It has been found, however, that the tensile cords of the prior art do not provide suitable impact resistance and dimensional stability over long periods of time, and do not provide a satisfactory solution to the problem of handling heavy loads where the belts are subjected to impact forces and high temperature in the use thereof.

While a number of attempts have been made to provide suitable characteristics of such tensile cords to effect such long, troublefree life, there has been no completely satisfactory solution to this vexatious problem heretofore.

DISCLOSURE OF INVENTION

The present invention comprehends an improved tensile cord and belt manufacture which solves this vexatious problem in a novel and simple manner by forming the tensile cord by twisting a plurality of polyester yarns helically to form the cord, coating the cord with adhesive, drawing the adhesive-coated cord at high temperature to define a cord having a toughness of at least 8.5 g/d, an elongation of less than 2.2% under a load of 1.52 g/d, and a shrinkage of no greater than 3.5% under dry heat of 150° C.

The invention further comprehends that the tensile cords be formed to have a shrinkage stress under dry heat of 150° C. of at least 0.22 g/d.

Preferably, the cords have a toughness of greater than 8.8 g/d, and an elongation under a load of 1.52 g/d of less than 2.0%.

The cords of the present invention preferably have a shrinkage stress under dry heat of 150° C. of at least 0.23 g/d, and a shrinkage of no greater than 3.3% under dry heat of 150° C.

The invention comprehends utilizing such cords as the tensile cords of an impact-resistant power transmission belt wherein the cords are adhesively bonded to the embedding rubber of the belt body.

The invention comprehends the method of forming such tensile cords, the method of forming impact-resistant power transmission belts utilizing such cords as the tensile members thereof, and the tensile cord and power transmission belt products.

Thus, the power transmission belt and tensile cord manufacture of the present invention is extremely simple and economical while yet providing a novel solution to the longstanding vexatious problems discussed above.

BRIEF DESCRIPTION OF THE DRAWING

Other features and advantages of the invention will be apparent from the following description taken in connection with the accompanying drawing wherein the drawing is a transverse section of a power transmission belt having tensile cords embodying the invention.

BEST MODE FOR CARRYING OUT THE INVENTION

In the illustrative embodiment of the invention as disclosed in the drawing, a power transmission belt generally designated 10 comprises a V-belt having a compression section 11, a cushion rubber section 12, and an outer fabric covering 13. A plurality of tensile cords 14 embodying the invention are disposed in transversely spaced side-by-side relationship extending longitudinally the length of the belt for providing desirable dimensional stability thereto during the useful life of the belt.

The tensile cords are formed to accommodate high impact shock forces acting on the belt during the use thereof, while maintaining desirable elongation strength and resistance to shrinking by evolved heat during the operation of the drive system. Thus, the tensile cords of the present invention coordinate a number of physical characteristics which heretofore have not been concurrently achieved in the power transmission belts of the prior art and which, thus, have not proven satisfactory in such uses.

More specifically, the invention comprehends the provision of the tensile cords by helically twisting together strands of high toughness-type polyester multifilament yarns. The resultant cord is then provided with an adhesive and finished by drawing and setting the cords under high heat so as to cause the cords to have a toughness of at least 8.5 g/d, an elongation of less than 2.2% under a load of 1.52 g/d, and a shrinkage of no greater than 3.5% under dry heat of 150° C., and a shrinkage stress under dry heat of 150° C. of at least 0.20 g/d.

Preferably, the cords are caused to have a shrinkage stress under dry heat of 150° C. of at least 0.23 g/d, a toughness of greater than 8.8 g/d, an elongation under load of 1.52 g/d less than 2.2%, and a shrinkage of no greater than 3.3% under dry heat of 150° C.

It is preferred that the cord have a total denier in the range of 6000 to 60,000. Pretreatment of the cords may be effected by subjecting them to isocyanate or epoxy followed by the application of adhesive in an RFL solution. The thusly adhesively coated cords are thermally drawn and set at a high temperature of 65° to 240° C. The polyester filaments have an ultimate viscosity preferably in the range of 0.75 to 0.9, and are preferably twisted with a ply twisting factor of approximately 1.5 to 4.0 where the twisting factor equals $0.0348 \times \text{twist turns/cm} \times \sqrt{\text{total denier}}$. The shrinkage of the filaments under dry heat of 150° C. for 30 minutes is preferably 2 to 10%, and the shrinkage stress under dry heat of 150° C. for 8 minutes is preferably equal to 0.01 to 0.15 g/d.

The static and dynamic evaluations of cords and belts manufactured in accordance with the invention are shown in Tables 1 and 2 hereinfollowing.

The toughness of the tensile cords set out in Table 1 was determined on the basis of the elongation strength curve obtained according to JIS L-1017 (1983), the formula being:

$$\text{toughness} = \tfrac{1}{2} \cdot \text{strength} \sqrt{\text{elongation}}.$$

The elongation values under load of 1.52 g/d of Table 1 were determined according to JIS L-1017 (1983).

The shrinkage under dry heat indicated in Table 1 was determined according to JIS L-1017 (1983), with the specimen subjected to an atmosphere of 150° C. for 30 minutes.

The shrinkage stress determinations indicated in Table 1 were made according to JIS L-1017 (1983), with the specimens being subjected to 150° C. for 8 minutes.

The JIS tests are those set forth by Japan Industrial Standards, and are well-known to those skilled in the art.

Evaluating the cords and belts under load, the tests were carried out with a drive arrangement wherein a V-belt is connected between a driver and driven pulley, with the driven pulley having connected thereto a 40 ps load. The tests were run at room temperature, and after 120 hours of such operation, the axle weight, slippage representing the difference in revolution ratios between the driving and driven shafts, and the belt elongation were determined. The belt strength retainability represents the ratio of the belt strength after the test to the belt strength prior thereto.

The toughness of the belts was determined in the same manner as the toughness of the cords, as the belt strength value was regarded as identical with the individual cord strength values.

The tensile cord members were considered to bear substantially the entire longitudinal load of the belt. The elongation test of the belts under 1.52 g/d load was determined in the same manner as the cord elongation. The shrinkage of the belt under dry heat was calculated similarly as to the calculation for the cords. More specifically, the belts were subjected to a heat of 150° C. for 30 minutes, and the difference between the peripheral belt length before and after the treatment was divided by the length before the treatment to give the listed value.

The belt shrinkage after 100 days following vulcanization was determined by determining the difference between the peripheral belt length immediately after the vulcanization and the belt length after the lapse of 100 days divided by the length immediately after the vulcanization.

TABLE 1

| Code No. | | Construction | Twist factor | Pre-treatment preparation | Adhesive | Heat applied to cord (°C.) | Total drawn rate (%) | Toughness g/d | Elongation (%) under 1.52 g/d | Dry heat shrinkage (%) | Dry heat shrinkage stress g/d |
|---|---|---|---|---|---|---|---|---|---|---|---|
| Example | 1 | 1100 d/6 × 5 | 3.0 | Isocyanate | RFL solution | 65–240 | 3.0 | 8.7 | 2.0 | 3.2 | 0.22 |
| inven- | 2 | ↑ | ↑ | ↑ | ↑ | ↑ | 4.0 | 8.5 | 2.0 | 3.5 | 0.25 |
| tion | 3 | 1100 d/10 × 3 | ↑ | ↑ | ↑ | ↑ | 4.0 | 9.0 | 2.1 | 3.3 | 0.23 |
| Compar- | 1 | 1100 d/6 × 5 | 2.0 | Isocyanate | RFL solution | 65–240 | 1.8 | 11.7 | 2.1 | 3.0 | 0.18 |
| ison | 2 | ↑ | ↑ | ↑ | ↑ | ↑ | 3.2 | 11.5 | 2.2 | 3.7 | 0.11 |
| | 3 | ↑ | ↑ | ↑ | ↑ | ↑ | 5.2 | 7.4 | 1.8 | 3.5 | 0.19 |
| | 4 | ↑ | 3.0 | ↑ | ↑ | ↑ | 2.2 | 9.1 | 2.1 | 2.8 | 0.18 |
| | 5 | ↑ | ↑ | ↑ | ↑ | ↑ | 2.5 | 9.2 | 2.1 | 2.9 | 0.18 |
| | 6 | ↑ | ↑ | ↑ | ↑ | ↑ | ↑ | 11.4 | 2.4 | 2.2 | 0.09 |
| | 7 | ↑ | ↑ | ↑ | ↑ | ↑ | ↑ | 10.4 | 2.2 | 2.7 | 0.13 |
| | 8 | ↑ | ↑ | ↑ | ↑ | ↑ | 3.2 | 14.8 | 3.4 | 1.6 | -0.04 |
| | 9 | ↑ | ↑ | ↑ | ↑ | ↑ | ↑ | 9.8 | 2.1 | 3.3 | 0.16 |
| | 10 | ↑ | ↑ | ↑ | ↑ | ↑ | 5.2 | 13.8 | 2.7 | 2.3 | 0.08 |
| | 11 | ↑ | ↑ | ↑ | ↑ | ↑ | ↑ | 12.9 | 2.2 | 2.6 | 0.13 |
| | 12 | ↑ | ↑ | ↑ | ↑ | ↑ | 6.2 | 13.4 | 2.6 | 2.8 | 0.10 |
| | 13 | ↑ | ↑ | ↑ | ↑ | ↑ | ↑ | 12.3 | 2.1 | 3.1 | 0.15 |
| | 14 | 1100 d/10 × 3 | ↑ | ↑ | ↑ | ↑ | 3.7 | 12.2 | 2.1 | 3.2 | 0.19 |
| | 15 | 1100 d/5 × 2 3 | ↑ | ↑ | ↑ | ↑ | 5.2 | 10.1 | 1.7 | 4.0 | 0.18 |
| | 16 | ↑ | ↑ | ↑ | ↑ | ↑ | ↑ | 10.0 | 1.8 | 4.1 | 0.19 |
| | 17 | 1100 d/6 × 5 | ↑ | ↑ | ↑ | ↑ | 5.0 6.5 | 7.5 | 2.0 | 3.7 | 0.20 |

TABLE 2

|  | Belt No. | Cord No. | Static Belt Efficiency | | | | Dynamic Belt Efficiency | | | |
|---|---|---|---|---|---|---|---|---|---|---|
|  |  |  | Toughness g/d | Elongation under 1.52 g/d | Dry heat shrinkage | Belt shrinkage in 100 days after vulcanization | Heavy Loaded Running | | | Strength retainability after impact running |
|  |  |  |  |  |  |  | Axle load | Slippage | Belt elongation |  |
| Example invention | 1 | 1 | 8.9 | 86 | 99 | 99 | 103 | 98 | 86 | 137 |
|  | 2 | 2 | 10.0 | 91 | 99 | 96 | 105 | 91 | 83 | 131 |
|  | 3 | 3 | 8.8 | 77 | 105 | 100 | 112 | 89 | 87 | 133 |
| Comparison | 1 | 3 | 7.1 | 82 | 116 | 116 | — | — | — | — |
|  | 2 | 5 | 8.7 | 82 | 76 | 83 | 91 | 114 | 117 | 136 |
|  | 3 | 6 | 8.7 | 95 | 53 | 53 | 68 | 181 | 176 | 135 |
|  | 4 | 7 | 9.6 | 105 | 76 | — | 82 | 123 | 110 | 139 |
|  | 5 | 9 | 9.5 | 86 | 88 | 83 | 96 | 105 | 97 | 139 |
|  | 6 | 11 | 10.5 | 109 | 82 | — | — | — | — | — |
|  | 7 | 12 | 12.7 | 118 | 82 | — | — | — | — | — |
|  | 8 | 13 | 10.8 | 95 | 106 | — | — | — | — | — |
|  | 9 | 17 | 7.1 | 100(2.2%) | 100(1.7%) | 100(0.95%) | — | — | — | — |

It was found that by coordinating the different characteristics of the cords and belts, as indicated in the above Tables, a substantially improved tensile cord and belt manufacture resulted which effectively avoided the problems of the prior art and providing long, trouble-free life of a power transmission belt subjected to substantial impact shock forces during the running thereof. As indicated above, the invention comprehends that the toughness of the cords should be at least 8.5 g/d, the elongation under load of 1.52 g/d should be 2.2% or less, the shrinkage under dry heat at 150° C. should be 3.5% or less, and the shrinkage stress under dry heat should be 0.20 g/d or more.

The invention has been disclosed in connection with a power transmission belt utilizing the tensile cords in a wrapped V-belt construction. The invention comprehends the use of the tensile cords in other forms of power transmission belts, as will be obvious to those skilled in the art.

The bonding of the tensile cords to the embedding rubber may be effected by the use of any suitable adhesion agent as well as the above disclosed adhesive agent.

The foregoing disclosure of specific embodiments are illustrative of the broad inventive concepts comprehended by the invention.

We claim:

1. The method of forming an impact-resistant power transmission belt comprising
embedding in a rubber portion of a power transmission belt body adhesively coated thermally drawn and set tensile cords having a toughness of at least 8.5 g/d, an elongation of less than 2.2% under a load of 1.52 g/d, a shrinkage of no greater than 3.5% under dry heat of 150° C., and a shrinkage stress under dry heat of 150° C. of at least 0.20 g/d.

2. The method of forming an impact-resistant power transmission belt of claim 1 wherein said tensile cords are caused to have a shrinkage of no greater than 3.3% under dry heat of 150° C.

3. The method of forming an impact-resistant power transmission belt of claim 1 wherein said tensile cords are caused to have a toughness of greater than 8.8 g/d.

4. The method of forming an impact-resistant power transmission belt of claim 1 wherein said tensile cords are caused to have an elongation under a load of 1.52 g/d of less than 2.0%.

5. The method of forming an impact-resistant power transmission belt of claim 1 wherein said tensile cords are caused to have a shrinkage stress under dry heat of 150° C. of at least 0.23 g/d.

6. The method of forming a tensile cord member for an impact-resistant power transmission belt, comprising the steps of:
twisting a plurality of polyester yarns helically to form a cord;
coating the cord with adhesive;
drawing the adhesive-coated cord at high temperature to define a cord having a toughness of at least 8.5 g/d, an elongation of less than 2.2% under a load of 1.52 g/d, a shrinkage of no greater than 3.5% under dry heat of 150° C., and a shrinkage stress under dry heat of 150° C. of at least 0.20 g/d; and
setting the thermally drawn adhesive coated cord.

7. The method of forming a tensile cord member for an impact-resistant power transmission belt of claim 6 wherein said tensile cord is caused to have a shrinkage of no greater than 3.3% under dry heat of 150° C.

8. The method of forming a tensile cord member for an impact-resistant power transmission belt of claim 6 wherein said tensile cord is caused to have a toughness of greater than 8.8 g/d.

9. The method of forming a tensile cord member for an impact-resistant power transmission belt of claim 6 wherein said tensile cord is caused to have an elongation under a load of 1.52 g/d of less than 2.0%.

10. The method of forming a tensile cord member for an impact-resistant power transmission belt of claim 6 wherein said tensile cord is caused to have a shrinkage stress under dry heat of 150° C. of at least 0.23 g/d.

11. An impact-resistant power transmission belt tensile cord comprising
an adhesive-coated, thermally drawn and set, helically wound group of polyester filaments having a toughness of at least 8.5 g/d, an elongation of less than 2.2% under a load of 1.52 g/d, a shrinkage of no greater than 3.5% under dry heat of 150° C., and a shrinkage stress under dry heat of 150° C. of at least 0.20 g/d.

12. The impact-resistant power transmission belt tensile cord of claim 11 wherein the tensile cord has a shrinkage of no greater than 3.3% under dry heat of 150° C.

13. The impact-resistant power transmission belt tensile cord of claim 11 wherein said tensile cord is caused to have a toughness of greater than 8.8 g/d.

14. The impact-resistant power transmission belt tensile cord of claim 11 wherein said tensile cord is caused to have an elongation under a load of 1.52 g/d of less than 2.0%.

15. The impact-resistant power transmission belt tensile cord of claim 11 wherein said tensile cord is caused to have a shrinkage stress under dry heat of 150° C. of at least 0.23 g/d.

* * * * *